(12) United States Patent
Hutzelmann et al.

(10) Patent No.: US 9,322,331 B2
(45) Date of Patent: Apr. 26, 2016

(54) CONNECTING ROD FOR TWO STAGE VARIABLE COMPRESSION

(71) Applicant: Hilite Germany GmbH, Marktheidenfeld (DE)

(72) Inventors: Stefanie Hutzelmann, Graefendorf (DE); Falk Mueller, Wuerzburg (DE); Dietmar Schulze, Muenzenberg (DE); Manfred Balling, Wuerzburg (DE); Tobias Matschiner, Marktheidenfeld (DE); Christian Scheibe, Mannheim (DE)

(73) Assignee: Hilite Germany GmbH, Marktheidenfeld (DE)

( * ) Notice: Subject to any disclaimer, the term of this patent is extended or adjusted under 35 U.S.C. 154(b) by 124 days.

(21) Appl. No.: 14/284,814

(22) Filed: May 22, 2014

(65) Prior Publication Data

US 2015/0075497 A1    Mar. 19, 2015

(30) Foreign Application Priority Data

Jul. 5, 2013   (DE) .................... 10 2013 107 127

(51) Int. Cl.
| | |
|---|---|
| *F02B 75/04* | (2006.01) |
| *F16C 7/06* | (2006.01) |
| *F02B 75/32* | (2006.01) |
| *F02D 15/02* | (2006.01) |

(52) U.S. Cl.
CPC ............. *F02B 75/044* (2013.01); *F02B 75/045* (2013.01); *F02B 75/32* (2013.01); *F16C 7/06* (2013.01); *F02D 15/02* (2013.01)

(58) Field of Classification Search
CPC ...... F02B 75/044; F02B 75/045; F02B 75/32; F02D 15/02; F16C 7/06
USPC .............. 123/48 A, 48 B, 41.37, 78 E, 197.4, 123/197.3
See application file for complete search history.

(56) References Cited

U.S. PATENT DOCUMENTS

| | | | | |
|---|---|---|---|---|
| 2,151,853 | A | * 3/1939 | Jonville | ................ F02B 75/045 123/78 BA |
| 4,864,977 | A | * 9/1989 | Hasegawa | ............... F02D 15/02 123/48 B |

(Continued)

FOREIGN PATENT DOCUMENTS

| | | |
|---|---|---|
| DE | 102005055199 A1 | 5/2007 |
| DE | 10 2010 019004 | 11/2011 |

(Continued)

*Primary Examiner* — Marguerite McMahon
*Assistant Examiner* — Tea Holbrook
(74) *Attorney, Agent, or Firm* — Von Rohrscheidt Patents

(57) ABSTRACT

A connecting rod for a two stage variable compression in an internal combustion engine, the connecting rod including a combustion piston pin support eye that is arranged offset relative to an axis in an eccentrical component which is pivotable about the axis in a first direction of rotation through a first hydraulic displacement cavity and pivotable in a second direction of rotation through a second hydraulic displacement cavity, wherein a hydraulic valve is arranged in the connecting rod, wherein the hydraulic valve includes a hydraulic supply connection at which a hydraulic pressure is applied, wherein the hydraulic pressure moves a hydraulic piston against a force of a preload of a spring, wherein the hydraulic piston remains in a stable low pressure position in a low range of the hydraulic pressure due to the preload of the spring.

11 Claims, 13 Drawing Sheets

(56) References Cited

U.S. PATENT DOCUMENTS

| | | | |
|---|---|---|---|
| 4,934,347 A * | 6/1990 | Suga | F02B 75/044 123/48 B |
| 4,979,427 A * | 12/1990 | Pfeffer | F02B 75/044 123/48 B |
| 5,257,600 A * | 11/1993 | Schechter | F02B 75/044 123/78 B |
| 5,417,185 A * | 5/1995 | Beattie | F02B 75/04 123/48 B |
| 5,655,633 A * | 8/1997 | Nakadate | F16F 9/467 188/266.6 |
| 7,434,548 B2 * | 10/2008 | Takahashi | F02B 75/044 123/48 B |
| 7,527,026 B1 * | 5/2009 | Berger | F02B 75/045 123/48 B |
| 7,533,638 B1 * | 5/2009 | Berger | F02B 75/045 123/48 B |
| 7,685,974 B2 * | 3/2010 | Berger | F02B 75/045 123/48 B |
| 8,387,573 B2 * | 3/2013 | Lee | F02D 15/02 123/48 B |
| 2007/0175422 A1 * | 8/2007 | Takahashi | F02D 15/02 123/78 BA |
| 2009/0133651 A1 | 5/2009 | Takenaka | |
| 2009/0212244 A1 | 8/2009 | Pfaff et al. | |
| 2010/0139479 A1 * | 6/2010 | Pirault | F02B 75/044 92/181 P |
| 2015/0059683 A1 * | 3/2015 | Schulze | F02B 75/045 123/197.3 |

FOREIGN PATENT DOCUMENTS

| | | |
|---|---|---|
| DE | 10 2010 061 337 A1 | 6/2012 |
| DE | 102010 061360 A1 | 6/2012 |
| DE | 102010061362 | 6/2012 |
| DE | 102012014917 | 2/2013 |
| EP | 1610008 A1 | 12/2005 |
| EP | 2 375 014 A1 | 10/2011 |
| JP | 5837940 | 4/2014 |
| KR | 1020110037392 A | 4/2011 |
| WO | WO99/10666 | 6/2001 |

* cited by examiner

CONNECTING ROD FOR TWO STAGE VARIABLE COMPRESSION

RELATED APPLICATIONS

This application claims priority from German patent application DE 10 2013 107 127.9 filed on Jul. 5, 2013 which is incorporated in its entirety by this reference.

FIELD OF THE INVENTION

The invention relates to a connecting rod for a two stage variable compression of an internal combustion.

BACKGROUND OF THE INVENTION

A connecting rod for a two stage variable compression is already known from MTZ 05/2012 pages 388-392. According to the invention a piston pin support eye is configured as an eccentrical element. The eccentrical element is pivotable through a first hydraulic displacement cavity into a first direction of rotation and through a second hydraulic displacement cavity into a second direction of rotation. Thus, a hydraulic valve is arranged in the connecting rod. The hydraulic valve is configured as a 3/2-way valve.

BRIEF SUMMARY OF THE INVENTION

Thus, it an object of the invention to provide a connecting rod for a two stage variable compression of an internal combustion engine which is cost effective and reliably adjustable with a long service life between two variable compression stages.

The object is achieved through a connecting rod for a two stage variable compression in an internal combustion engine, the connecting rod including a combustion piston pin support eye that is arranged offset relative to an axis in an eccentrical component which is pivotable about the axis in a first direction of rotation through a first hydraulic displacement cavity and pivotable in a second direction of rotation through a second hydraulic displacement cavity, wherein a hydraulic valve is arranged in the connecting rod, wherein the hydraulic valve includes a hydraulic supply connection at which a hydraulic pressure is applied, wherein the hydraulic pressure moves a hydraulic piston against a force of a preload of a spring, wherein the hydraulic piston remains in a stable low pressure position in a low range of the hydraulic pressure due to the preload of the spring, wherein the supply connection is hydraulically connected with the first hydraulic displacement cavity in the low range of the hydraulic pressure, wherein the hydraulic piston continues to contact a stop at a housing in a high range of the hydraulic pressure due to a pressure applied to a hydraulic piston surface, wherein the supply connection is connected with the second hydraulic displacement cavity in a stable high pressure position of the hydraulic piston in the high range of the hydraulic pressure.

According to the invention a hydraulic valve is provided in the connecting rod which hydraulic valve includes a hydraulic supply connection. A hydraulic pressure is provided to the supply connection which hydraulic pressure can come in particular directly or indirectly from an oil pump. The hydraulic pressure can move a hydraulic piston of the hydraulic valve against a force of a preloaded spring. In a low pressure range of the supply connection the hydraulic piston remains unchanged in a stable low pressure position due to the preload of the spring.

In this stable low pressure position the supply connection is hydraulically connected with the first displacement cavity. Thus, the first displacement cavity empties towards the supply connection in bursts when a displacement cavity pressure is greater than a pressure at the supply connection due to gas or inertial forces at the connecting rod or eccentrical element.

The hydraulic piston includes at least one piston surface. When a pressure is supplied to the piston surface which comes from the supply connection or which is in a high pressure range the hydraulic piston contacts a stop. In this stable high pressure position the supply connection is connected with the second displacement cavity. Thus the second displacement cavity empties towards the supply connection in bursts when a pressure of the second displacement cavity is greater than a pressure at the supply connection due to gas or inertial forces at the connecting rod or eccentrical element.

Advantageously a displacement cavity is not filled with the relatively low pressure of the supply connection during adjustment. Instead the displacement cavities are emptied through the relatively high forces at the connecting rod against the relatively low pressure at the supply connection. Depending on the configuration of the internal combustion engine and the oil pump it is also feasible in an alternative embodiment of the invention to fill a displacement cavity with the pressure from the oil pump and to empty the other displacement cavity towards a tank connection against ambient pressure in the crank case. The oil is thus conducted radially inward into the hydraulic valve and subsequently conducted axially outward.

BRIEF DESCRIPTION OF THE DRAWINGS

Additional features and advantages of the invention are described based on embodiments with reference to appended drawing figures, wherein.

DETAILED DESCRIPTION OF THE INVENTION

Figure 1:
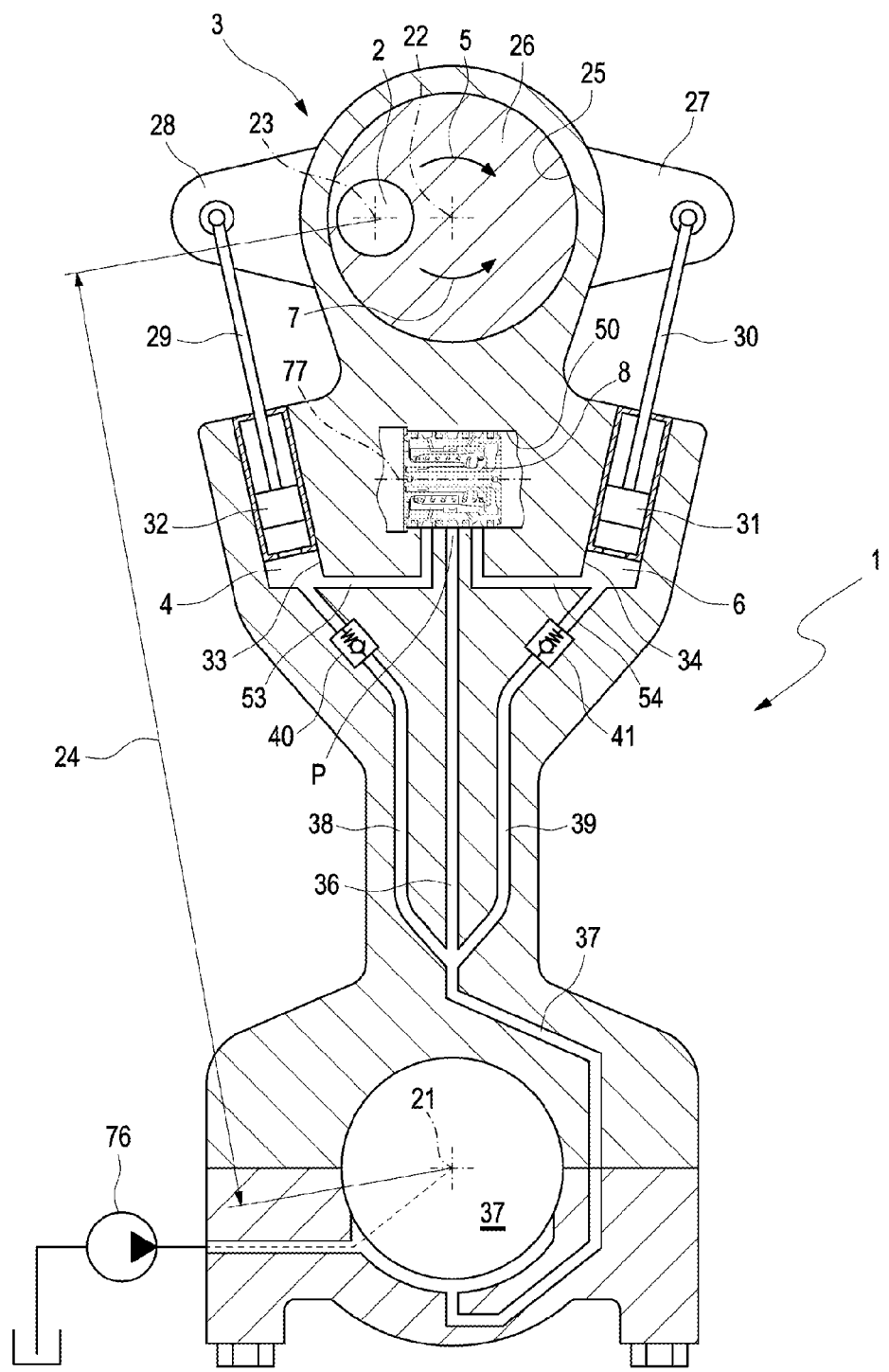
FIG. 1 illustrates a connecting rod of an internal combustion engine which connecting rod includes a hydraulic valve.

FIG. 1 illustrates a connecting rod 1 of an internal combustion engine. The connecting rod 1 includes an upper piston pin support eye 2 in which a piston pin is inserted that is not illustrated in detail. The piston pin is typically inserted into a combustion chamber piston of the internal combustion engine with a press fit. The piston pin support eye 2 is pivotable through an eccentrical element 3 about a pivot axis 22 wherein the pivot axis is arranged parallel to and offset from the longitudinal axis 23 of the piston pin support eye 2. Thus, it is possible to vary a distance 24 of the piston pin support eye 2 from a connecting rod bearing axis 21 of a connecting rod bearing 35. Thus, a variable compression of the combustion chamber can be implemented.

The eccentrical element 3 includes a pinion 26 that is pivotably arranged in a bore hole 25 of the connecting rod 1. Two arms 27, 28 extend diametrically relative to one another from the pinion 26. Support rods 29, 30 are arranged at ends of the two arms 27, 28. The support rods 29, 30 are pivotably linked at two small linear pistons 31, 32. Thus, it is feasible to pivot the pinion 26 within the bore hole 25 of the connecting rod 1. Thus, the small linear piston 31, 32 extends from a cylindrical bore hole 34, 33 within the connecting rod 1, whereas the other linear piston 32 or 31 moves into a cylindrical bore hole 33 or 34 of the connecting rod 1. When the linear piston 32 that is on a left side in the drawing moves in, the pinion 26 is pivoted in rotation direction 7 counter clockwise. When the linear piston 31 moves in that is on a right side in the drawing, the pinion 26 is pivoted accordingly in rotation direction 5 in clockwise direction. The clockwise rotation causes a movement of the piston pin support eye 2 further upward or further away from the connecting rod bearing axis 21. Thus, the distance 24 is increased and the compression in the combustion chamber is increased. When the right linear piston 31 has moved in to its maximum, the combustion chamber is set to maximum compression. Analogously pivoting the pinion 26 counter clockwise, this means in rotation direction 7, reduces the compression until a minimum compression stage is reached.

In order to control the two stages of compression a hydraulic valve 8 with a longitudinal valve axis 77 is provided. The hydraulic valve 8 facilitates running pressurized oil from a displacement cavity 4 or 6 to a supply connection P of the hydraulic valve 8. From the supply connection P oil is run through a channel 36, 37 to the connecting rod bearing 35 where it is introduced into a non illustrated oil supply of an eccentrical journal of the crank shaft. This eccentrical crank shaft journal is typically rotatably arranged within the connecting rod bearing 35. A four cylinder engine has for example four such eccentrical journals that are arranged at the crank shaft. Therefore the four cylinder engine also has four connecting rods 1 with a total of four connecting rods bearings 35.

The oil supply within the connecting rod bearing 35 comes from the oil pump 76 of the internal combustion engine and supplies the two displacement cavities 4, 6 through supply conduits 38, 39. Thus, a respective check valve 40, 41 is inserted into the two supply conduits 38, 39, wherein the check valve closes in flow direction from the respective displacement cavity 4 or 6 to the oil supply and opens into the opposite flow direction.

Forces transferred from the combustion chamber piston through the piston pin support eye 2 to the support rods 29, 30 are very high. These high forces are much higher than the forces induced at the linear piston 31 or 32 due to the pressure of the oil pump 76. Thus, the hydraulic valve 8 can press back to the oil supply from the first displacement cavity 6 or the second displacement cavity 4 as a function of the position of the hydraulic valve 8.

When a displacement cavity 6 or 4 is reduced in size due to the high forces of the combustion chamber piston, the other displacement cavity 4 or 6 sucks in oil from the oil supply through an opening check valve 40 or 41. On its path from the oil pump 76 to the oil supply within the crank shaft additional consumers are connected which branch off oil. In particular lubricated bearings reduce the oil pressure. The viscosity of the oil also influences oil pressure.

The hydraulic valve 8 and its function are subsequently described in more detail based on FIG. 2-17.

Figure 2:
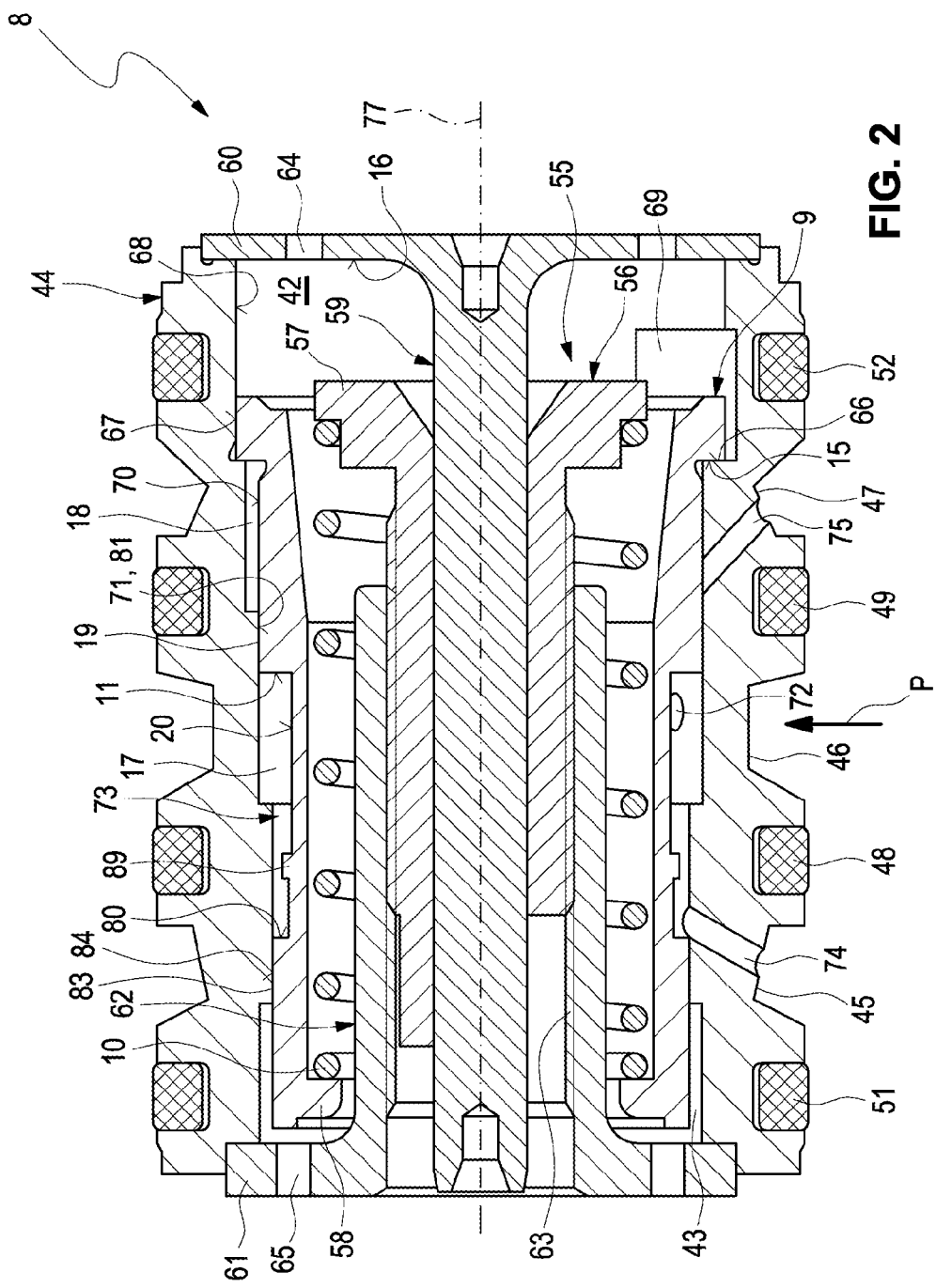
FIG. 2 illustrates the hydraulic valve of FIG. 1 with a hydraulic piston in a low pressure position according to the diagram of FIG. 3.
Figure 3:
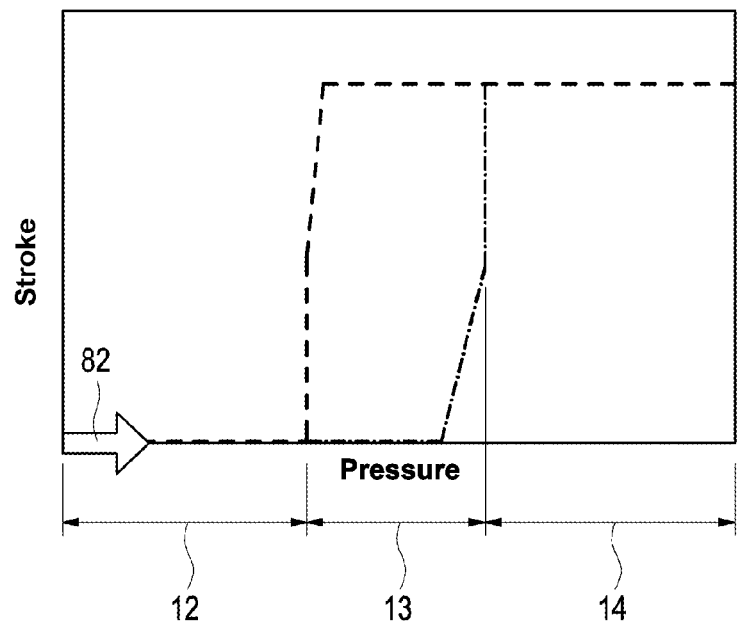
FIG. 3 illustrates a diagram depicting a low pressure position of the hydraulic piston indicated by an arrow.

FIG. 2 illustrates the hydraulic valve 8 according to the diagram of FIG. 3 in a condition in which a lower pressure is applied to the supply connection P. The hydraulic valve 8 has a sleeve shaped housing 44. The housing 44 includes three ring grooves 45, 46, 47 on its outside which are axially offset from one another.

The ring grooves 45, 46, 47 are hydraulically separated from one another through seal rings 48, 49. The hydraulic valve 8 is inserted into a bore hole 50 in the connecting rod 1. In order to prevent a pressure loss or leakages of the two outer ring grooves 45, 47 additional seal rings 51, 52 are provided. The two outer ring grooves 45, 47 lead to the associated displacement cavity 4 or 6 through a respective channel 53, 54. A hydraulic piston 9 is arranged axially moveable in the housing 44. The hydraulic piston 9 is configured hollow and supported spring elastic through a preloaded compression coil spring 10 and a spring support 55 indirectly at the housing 44. The spring support 55 is configured in three components. The spring support 55 includes a support sleeve 56 with a head 57 arranged within the housing 44. The compression coil spring 10 is axially supported on one side at a radially inward protruding shoulder 58 of the hydraulic piston 9. At the other end the compression coil spring 10 is supported at the head 57 of the support sleeve 56. The support sleeve 56 is pressed tight onto a center mandrel 59 which also has a plate shaped head 60. The plate shaped head 60 is supported at a first side of the housing 44. Another plate shaped head 61 of a screw element of the spring support 55 is supported at the other side of the housing 44. Thus, the screw element 62 has an inner thread 63. With this inner thread 63 the screw element 62 is threaded onto the support sleeve 56 which includes a corresponding external thread. Thus, the screw element 62 and the center mandrel 59 are clamped against the housing 44 through the support sleeve 56. Therefore the housing 44 is clamped between the two plate shaped heads 60, 61. Thus, the plate shaped head 60 of the center mandrel 59 is rather thin so that it is elastically deformable in axial direction relative to a center axis of the hydraulic valve 8 and operates as a disc spring. The two plate shaped heads 60, 61 include recesses 64, 65 so that no hydraulic fluid can be caught within the spaces 42, 43 defined by the plate shaped heads 60, 61 within the housing 44. This establishes free axial movability of the hydraulic piston 9. This means within the hollow hydraulic piston 9 the oil is freely moveable so that it can be introduced and also let out. A pressure influencing the hydraulic piston 9 cannot build up within the hydraulic piston 9.

The compression coil spring 10 is arranged radially within the hydraulic piston 9 and radially outside of the central mandrel 59 and of the threaded element 62.

In the starting position illustrated in FIG. 1 a radially outer piston surface 15 of the hydraulic piston 9 contacts a shoulder 66 of the housing 44. A supporting enveloping surface 67 of the hydraulic piston 9 adjoins at the radially outer piston surface 15 in a direction oriented towards the head 60 configured as a disc spring. The corresponding bore hole 68 within the housing 44 includes milled recesses 69 extending in circumferential direction and axially only over a partial portion of the bore hole 68. The function of the milled recess 69 is described in more detail with reference to FIGS. 6 and 7.

In the direction oriented towards the other plate shaped head 69 another enveloping support surface 70 adjoins at the radially outer piston surface 15. Thus, the transition from the radially outer piston surface 15 to the other enveloping support surface 70 is configured as a relief cut. The enveloping support surface 70 of the hydraulic piston 9 is moveably supported within a bore hole 71 of the housing 44. A radially inner piston surface 11 adjoins at the enveloping support surface 70. The radially inner piston surface 11 defines a first pressure cavity 17. Contrary thereto the outer piston surface 15 defines a second pressure cavity 18.

The two pressure cavities 17, 18 are thus hydraulically separated from one another through the sealing gap 19. The sealing gap 19 is formed between the enveloping support surface 70 and an inner wall 81 of the bore hole 71.

A transversal bore hole 72 leads into the first pressure cavity 17 wherein the transversal bore hole leads to the supply connection P of the hydraulic valve 8. This transversal bore hole 72 leads to an outer ring groove 73 of the hydraulic valve 8 wherein the outer ring groove has an axial width so that is assures a supply and outlet of oil in any position of the hydraulic piston 9. In the position of the hydraulic piston 9 illustrated herein a first bore hole 74 in the housing 44 is not covered by the hydraulic piston 9 wherein the first bore hole 74 thus connects the supply connection P through the channel 53 with the displacement cavity 4. Analogously a second bore hole 75 leads from the inner cavity of the housing 44 through the channel 54 to the displacement cavity 6. This second bore hole 75 is covered in the condition of the hydraulic valve 8 illustrated in FIG. 2 by the radially outer enveloping support surface 70 of the hydraulic piston 9.

With reference to FIG. 1 and FIG. 2 hydraulic fluid is conducted from the displacement cavity 4 through the channel 53 into the first bore hole 74 and run along the outer ring groove 73 through the bore hole 72 to the supply connection P. From the supply connection P the hydraulic fluid runs through the channels 36, 37 to the connecting rod bearing 35. However, since the first displacement cavity 6 cannot draw additional hydraulic fluid through the covered second bore hole 75, the other displacement cavity 6 simultaneously sucks in a substantial portion of the oil through the check valve 41 which oil is pressed out of the second displacement cavity 4. Thus the first displacement cavity 6 applies suction through the supply conduit 39 which leads into the channels 37, 38 and is thus connected with the oil supply and also with the supply connection P.

When the combustion piston is in its low position for minimum compression normal pressure variations in the hydraulic system do not lead to a change of the position of the hydraulic piston 9. According to FIG. 3 the hydraulic piston 9 does not perform a stroke even when the pressure increases slightly.

Figure 4:
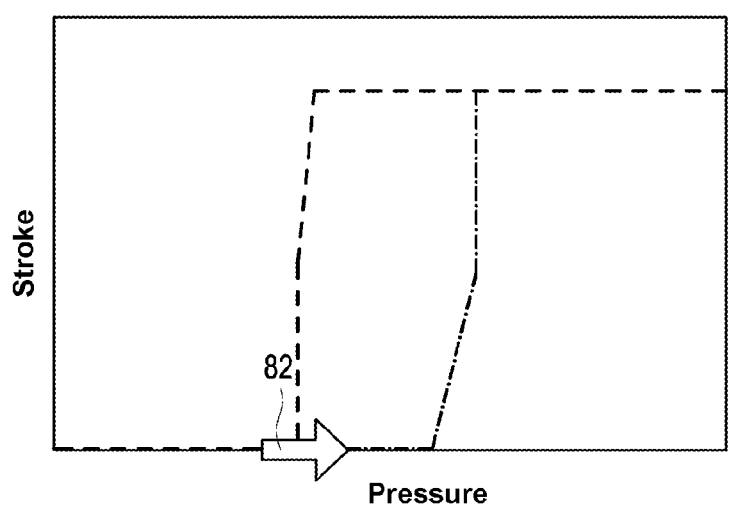
FIG. 4 illustrates a diagram representing the low pressure position of the hydraulic piston indicated by the arrow, however with increased pressure compared to FIG. 3.

FIG. 4 illustrates that no stroke of the hydraulic piston 9 is provided even when pressure at the supply connection increases further, so that the hydraulic piston 9 is still in the position illustrated in FIG. 2. In all diagrams stroke is plotted over pressure. Stroke is plotted for increasing pressure through a dotted line. The stroke is illustrated for decreasing pressure with a dashed line.

Figure 5:
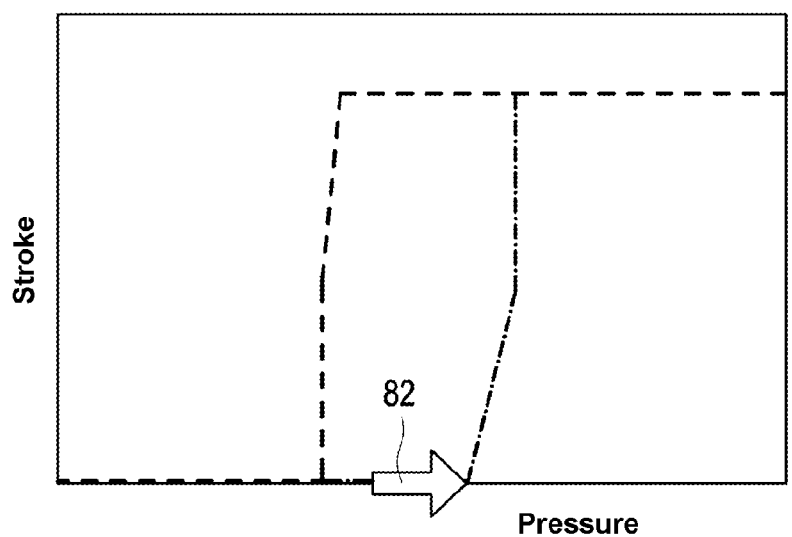
FIG. 5 illustrates a diagram which depicts the low pressure position of the hydraulic piston 4 indicated by the arrow, however with a pressure that is increased compared to FIG. 4.

FIG. 5 illustrates a pressure increase in the first hydraulic cavity 17 up to a value which is slightly below a value required for overcoming a preload of the compression coil spring 10.

Following the arrow 82 which is also used in FIG. 3 and FIG. 4 the pressure is visible that is increased compared to FIGS. 3 and 4 at which pressure the hydraulic piston 9 is in its low pressure position.

Figure 6:
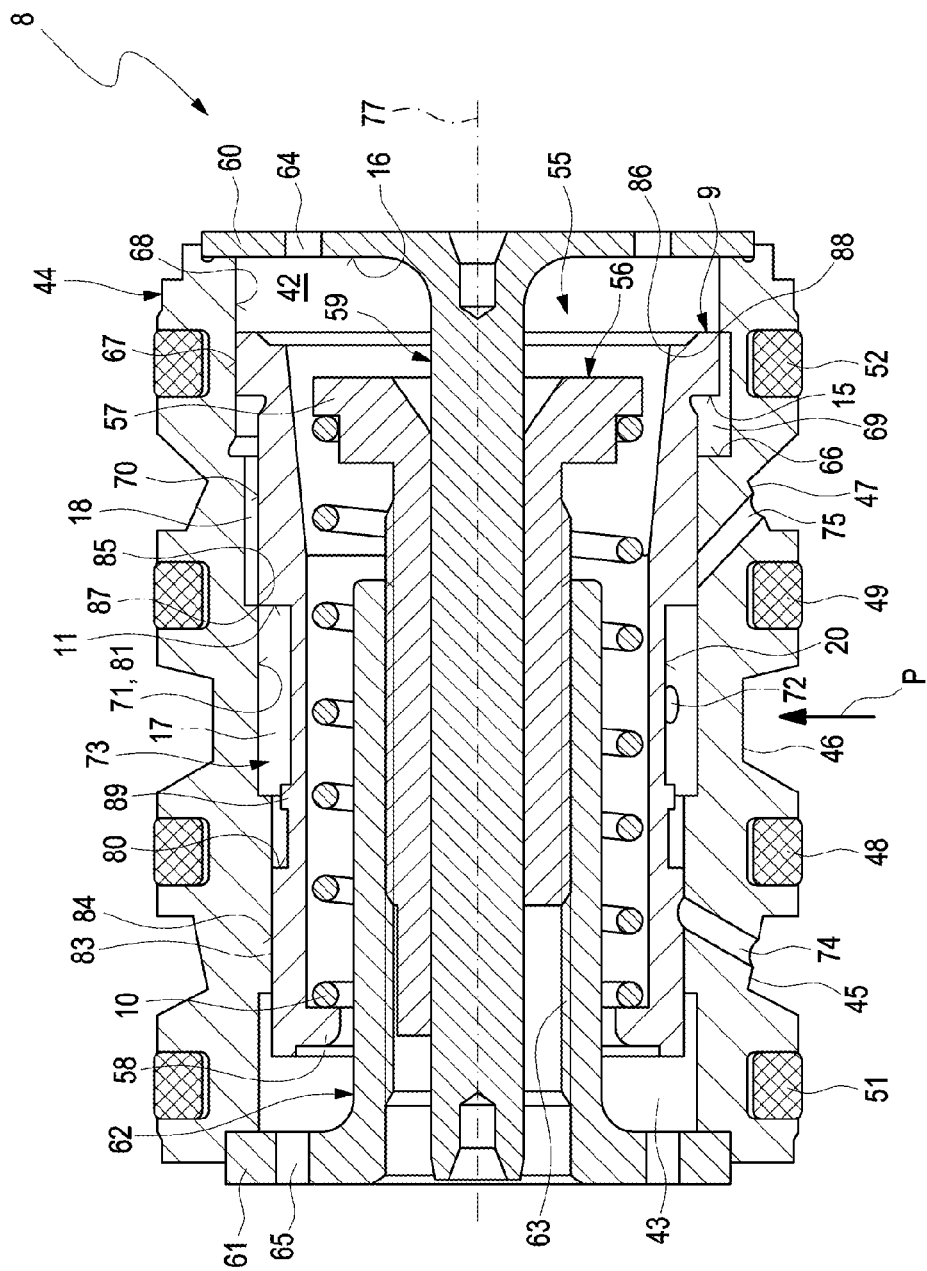
FIG. 6 illustrates the hydraulic valve of FIG. 2 when switching the hydraulic piston from the low pressure position.

FIG. 6 illustrates the hydraulic valve 8 of FIG. 2 when switching the hydraulic piston 9 from the low pressure position. The pressure in the first pressure cavity 17 has increased enough so that the preload of the compression coil spring 10 is overcome. According to the diagram of FIG. 7 the increased pressure coming from the supply connection P causes a force which moves the hydraulic piston 9 against the linear increasing force of the compression coil spring 10 towards the stop 16. This force is then formed from a force difference between a force engaging the radially inner piston surface 11 and a force engaging an opposite third piston surface 80. The third piston surface 80 is smaller than the radial inner piston surface 11 and also defines the pressure cavity 17. Similar to the seal gap 19 also the third piston surface 80 is defined by a seal gap 83 on a radial outside. The enveloping support surface 84 of the hydraulic piston 9 associated with the seal gap 83 closes the first bore hole 74 so that also the flow from the displacement cavity 4 to the supply connection P is blocked. The second bore hole 75 is still blocked in the position of the hydraulic piston 9 illustrated in FIG. 6 and FIG. 7, so that the supply pressure P can move the hydraulic piston 9 without fluid exchange from and to the displacement cavities 4 and 6 being able to influence the movement.

It is apparent from FIG. 6 that the second pressure cavity 18 is not completely rotation symmetrical in circumferential direction. Instead the second bore hole 75 leads into the bore hole 71, wherein this bore hole 71 is blocked by the hydraulic piston 9. The milled cut out 69 adjoins the bore hole 71 after the shoulder 56 of the housing 44. Thus, the milled cut out 69 enlarges the second pressure cavity 18. The pressure cavity 18 is defined in the illustrated position of the hydraulic piston 9 on one side by the first control edge 85 at an inner wall of the housing 44, and on the other side by a second control edge 86.

Thus, the two control edges 85, 86 terminate flush with two piston edges 87, 88 of the hydraulic piston 9 in its illustrated position.

Typically rather substantial leakages occur at the pass through of the pair control edge 85/piston edge 87, and also at the pass through of the pair control edge 86/piston edge 88.

Figure 7:
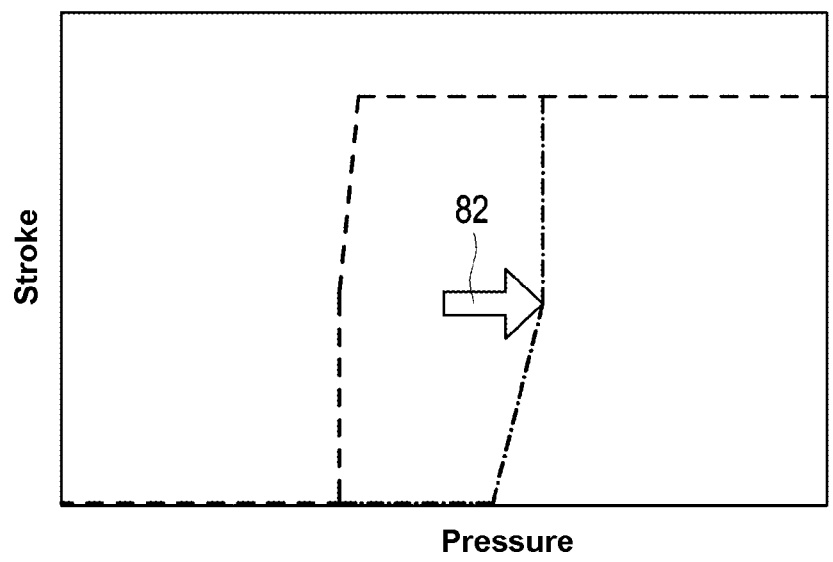
FIG. 7 illustrates a diagram depicting the hydraulic piston during switching according to FIG. 6.

From the pressure illustrated in the diagram of FIG. 7 the hydraulic piston 9 moves instantaneously to the stop 16, whereas the pressure remains constant. This is illustrated in FIG. 7 based on a dotted line extending vertically upward after a kink.

It is furthermore evident in FIG. 6 that an annular bar 89 extending radially outward from the groove base 20 of the outer ring groove 73 is configured as a throttle between the first bore hole 74 and the supply connection P wherein the throttle loses its throttling function when the first bore hole 74 is covered.

Figure 8:
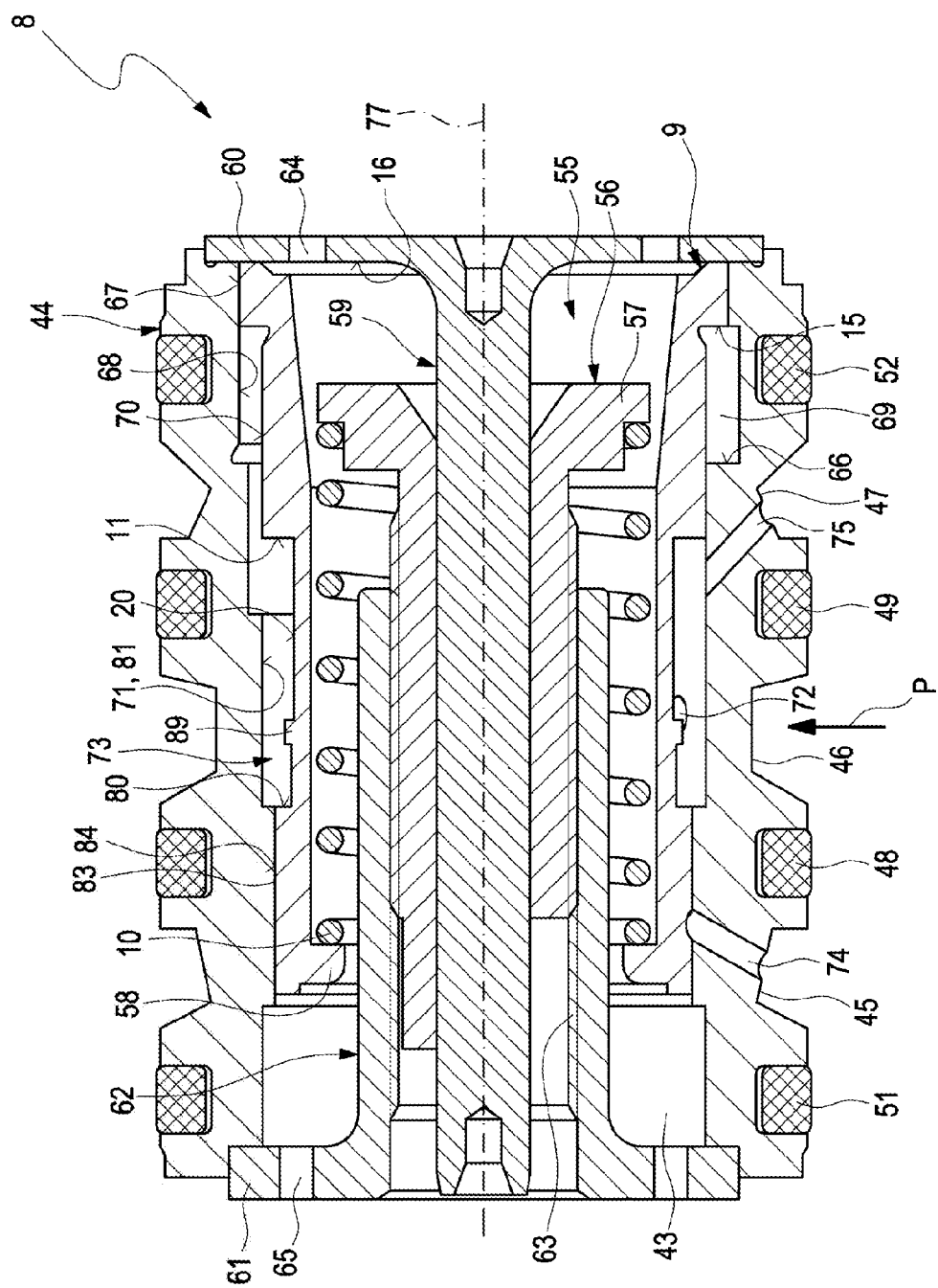
FIG. 8 illustrates the hydraulic valve according to FIG. 2 with the hydraulic piston in a high pressure position according to the diagram of FIG. 9.
Figure 9:
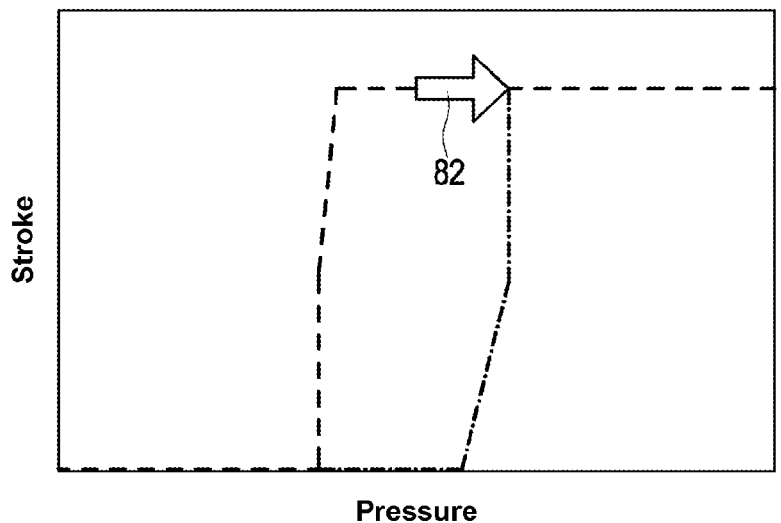
FIG. 9 illustrates the diagram associated with FIG. 8.

FIG. 8 illustrates the hydraulic valve of FIG. 2 with the hydraulic piston 9 in a high pressure position according to the diagram of FIG. 9. Thus, the pressure coming from the supply connection P and/or the second bore hole 75 impacts the two piston surfaces 11, 15. The force generated as a sum thereof is substantially larger than the opposite force which results from the pressure at the piston surface 80. Thus the hydraulic piston 9 contacts the stop 16 and cannot be moved any further. This is illustrated in the diagram in FIG. 9 according to which the stroke cannot increase any further even with rising pressure.

Figure 10:
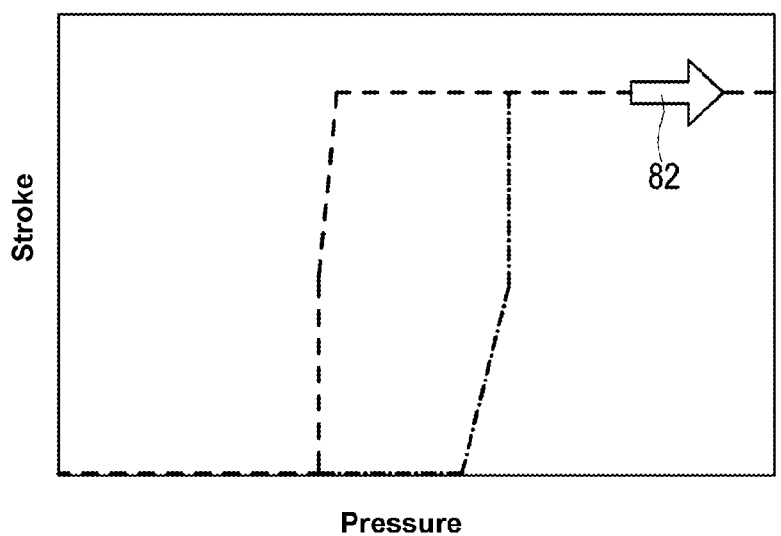
FIG. 10 illustrates a diagram which depicts the high pressure position of the hydraulic piston indicated by the arrow, however at a pressure that is increased over FIG. 9.

FIG. 10 thus illustrates a diagram which represents the high pressure position of the hydraulic piston 9 indicated by the arrow 82, however for a pressure that is increased further relative to FIG. 9.

Subsequently the characteristics of the hydraulic valve 8 are illustrated for a decreasing pressure at the supply connection P.

Figure 11:
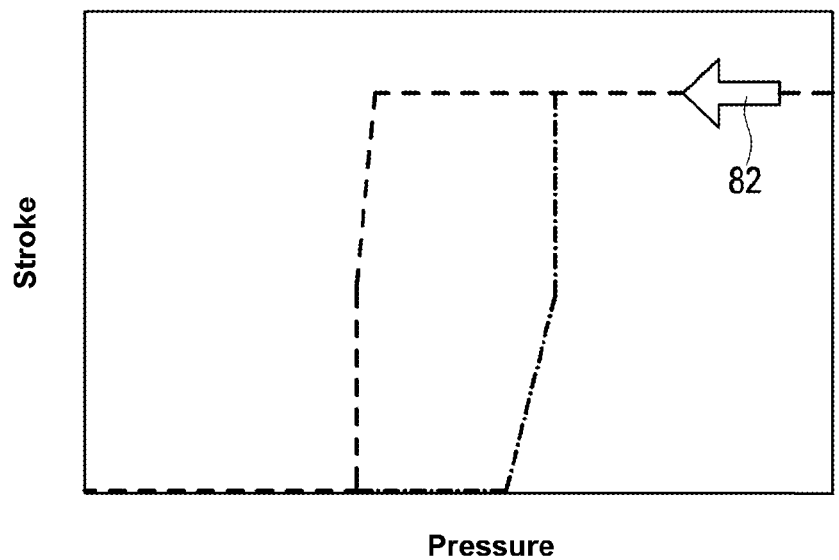
FIG. 11 illustrates a diagram which depicts the high pressure position of the hydraulic piston indicated by the arrow, however with decreased pressure compared to FIG. 10.

Thus, FIG. 11 illustrates a diagram which represents the high pressure position of the hydraulic piston 9 indicated by the arrow 82.

Figure 12:
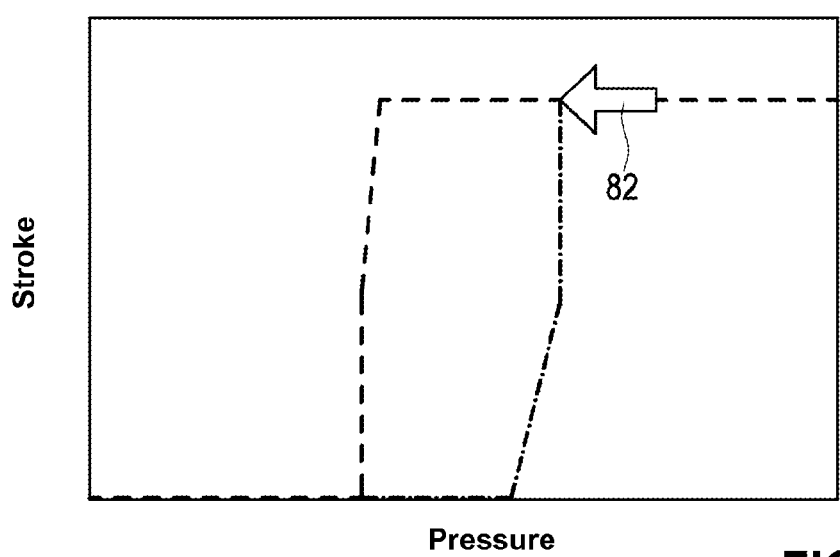
FIG. 12 illustrates a diagram which depicts the high pressure position of the hydraulic piston indicated by the arrow, however with a pressure that is decreased relative to FIG. 11.

According to the diagram in FIG. 12 the pressure drops further. It is further apparent from the arrow 82 that the hydraulic piston 9 is still in the high pressure position.

Figure 13:
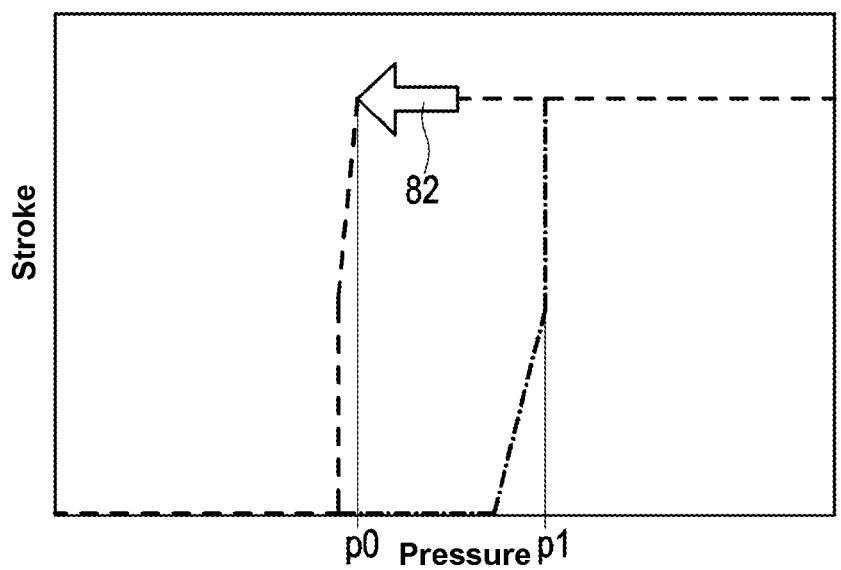
FIG. 13 illustrates a diagram which depicts the high pressure position of the hydraulic piston indicated by the arrow, however at a pressure that is further decreased compared to FIG. 12.

FIG. 13 illustrates a diagram depicting a high pressure position of the hydraulic piston, however for a pressure that is further decreased compared to FIG. 12. Thus, it is apparent that the hydraulic piston 9 continues to contact the stop 16 though the pressure p0 at the supply connection P has dropped below the pressure P1 where the hydraulic piston 9 came into contact with the stop 16 for increasing pressure.

Figure 14:
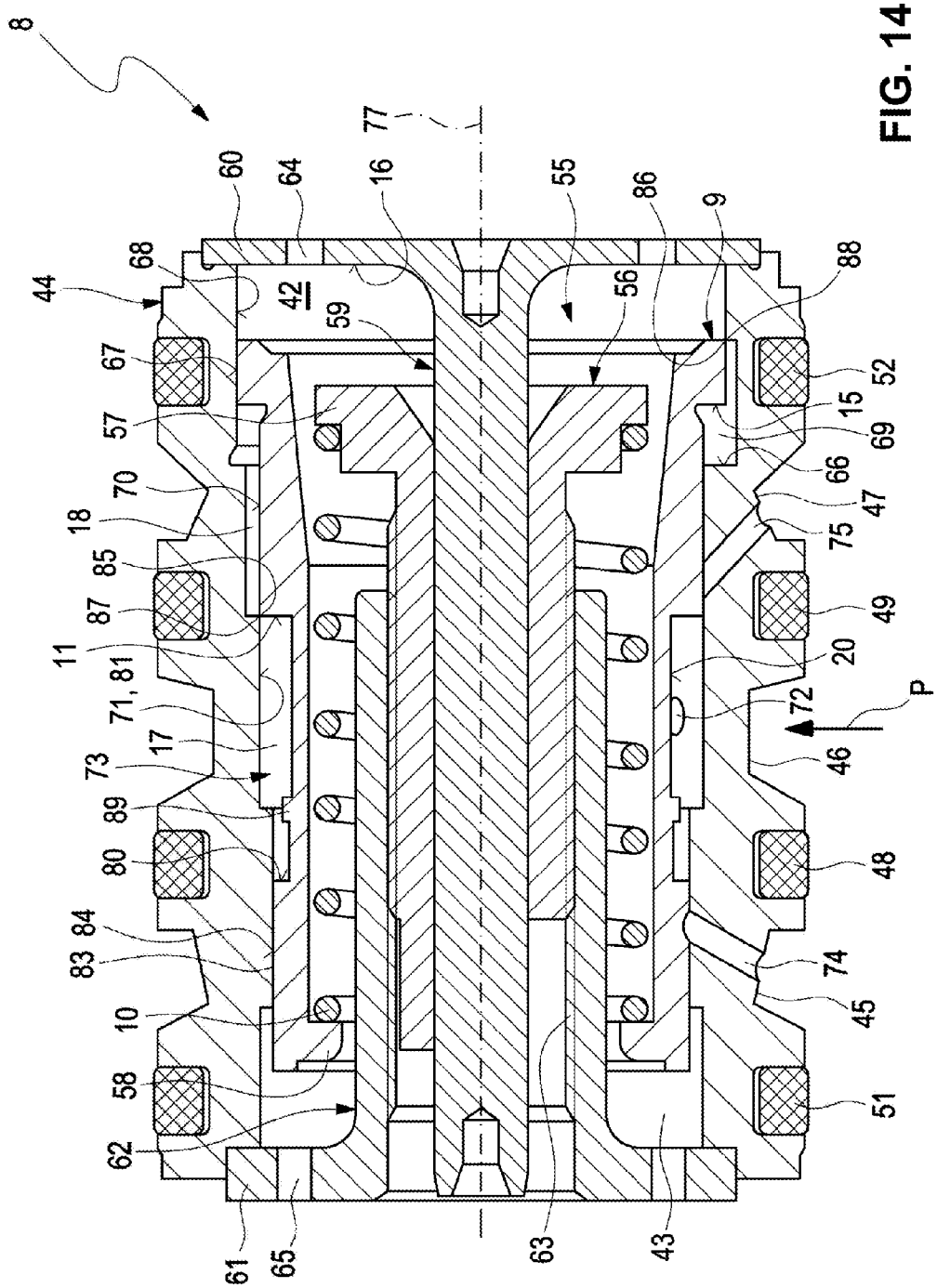
FIG. 14 illustrates the hydraulic valve of FIG. 2 during switching of the hydraulic piston from the high pressure position.
Figure 15:
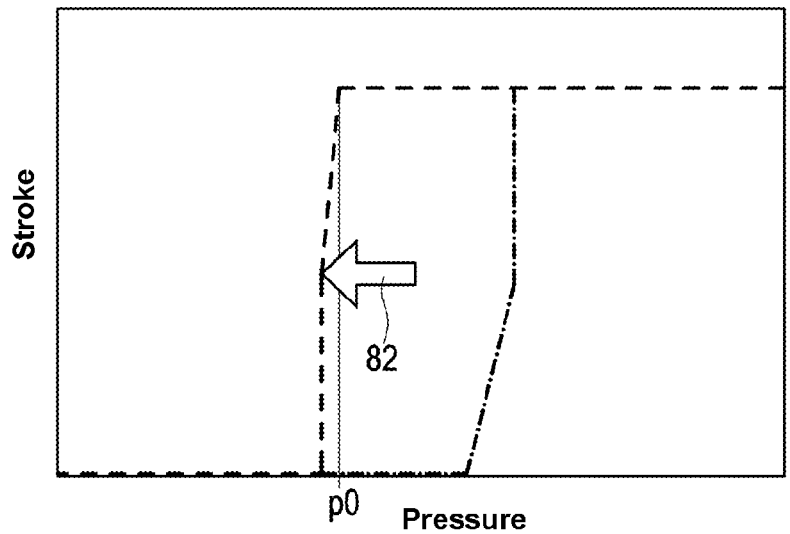
FIG. 15 illustrates a diagram which illustrates the hydraulic piston indicated by the arrow during switching according to FIG. 14.

According to the diagram of FIG. 15 which represents the hydraulic piston 9 during switching according to FIG. 14 indicated by the arrow 82 the stroke decreases in a linear manner over the pressure. This decrease starts from the high pressure position. The linear relationship comes from the linear characteristics of the compression coil spring 10.

The linear drop occurs until the hydraulic piston 9 has taken a position according to FIG. 14. The position according to FIG. 14 is identical with the position according to FIG. 6. Thus, the two control edges 85, 86 terminate flush again with the two piston edges 87, 88 of the hydraulic piston 9 in its illustrated position.

Figure 16:
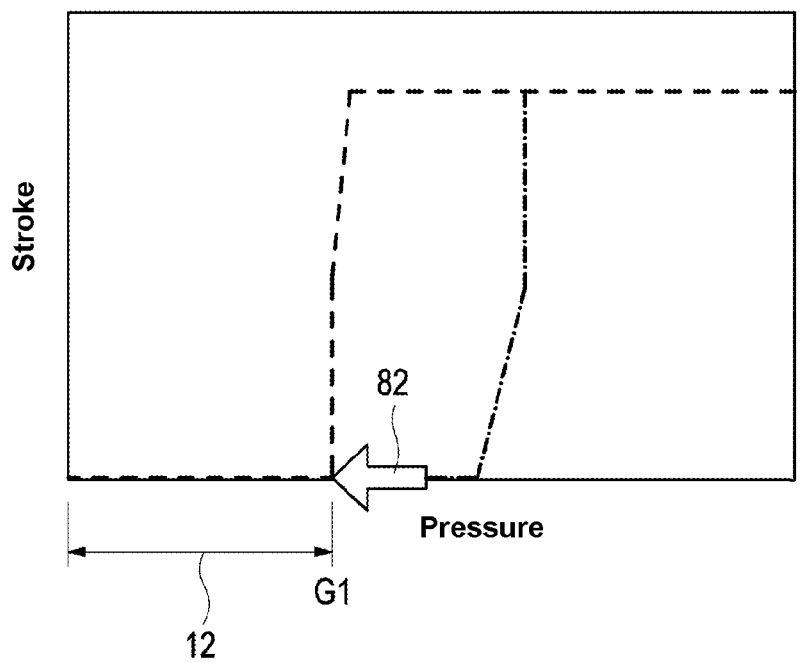
FIG. 16 illustrates a diagram which depicts the low pressure position of the hydraulic piston indicated by the arrow after the switching process.

FIG. 16 illustrates a diagram depicting the low pressure position of the hydraulic piston 9 indicated by the arrow 82 after the switching process. Thus, the pressure is at an upper threshold value G1 of the low pressure portion 12. The hydraulic piston 9 is in the position illustrated in FIG. 2 again in which the hydraulic piston 9 comes in contact with the radially outer piston surface 15 at the face 80.

Figure 17:
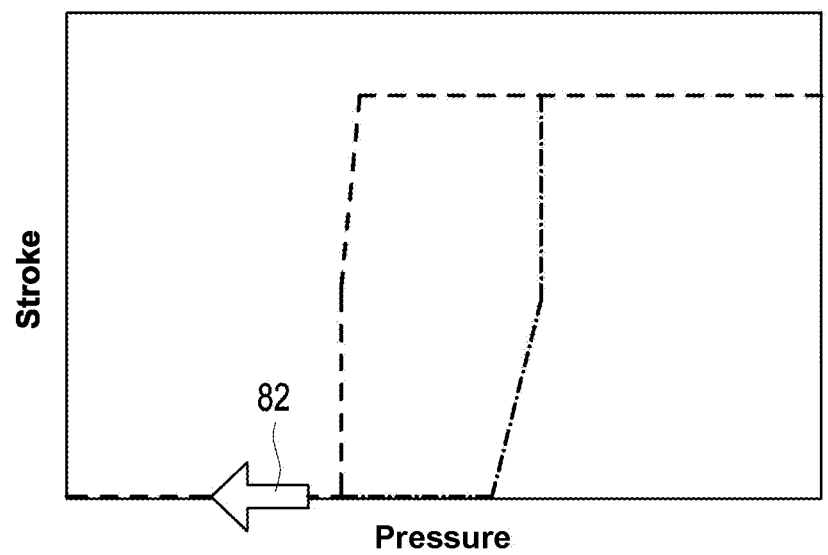
FIG. 17 illustrates a diagram which depicts the low pressure position of the hydraulic piston indicated by the arrow, however at a pressure that is further decreased over FIG. 16.

FIG. 17 illustrates a diagram depicting the low pressure position of the hydraulic piston 9 indicated by the arrow 82, however, at a pressure that has further decreased relative to FIG. 16.

The milled cut out 69 in the housing 44 recited supra has the following function. When the hydraulic piston 9 moves from the position according to FIG. 2 into the position according to FIG. 6 the volume in the second pressure cavity 18 increases. In order to fill the additionally required volume with air/oil mist/oil-mix, oil is sucked in through the recesses 64. The air/oil mist/oil-mix thus flows through the gap between the piston edge 88 and the second control edge 86 decreasing during the stroke of the hydraulic piston 9 and the increasing gap between the shoulder 66 and the radially outer piston surface 15. As soon as the position according to FIG. 6 is reached the air/oil mist/oil-mix is replaced by follow on oil from the first pressure cavity 17.

This applies analogously for the reverse travel of the hydraulic piston 9. When the hydraulic piston 9 moves from the position according to FIG. 14 into the position according to FIG. 2 the volume in the second pressure cavity 18 decreases. In order to clear the displaced volume from oil, the oil is expelled through the recesses 64. Thus, the oil flows through the gap between the piston edge 88 and the second control edge 86 that increases during the stroke of the hydraulic piston 9 and the gap between the shoulder 66 and the radially outer piston surface 15 which decreases.

The switching process at the hydraulic valve is triggered in particular through a short term change of the oil pressure. A short term quick increase of the oil pressure thus leads to an increase of the compression. A short term strong decrease of the oil pressure thus leads to a reduced compression.

In an alternative embodiment of the invention it is also feasible to switch the hydraulic valve through a long term change of the oil pressure through a variable oil pump.

Instead of a compression coil spring with linear characteristics a compression coil spring with progressive or digressive characteristics can also be used. Instead of the compression coil spring a packet made from disc springs can also be used.

Instead of oil also other hydraulic fluids are feasible.

The described embodiments are only exemplary embodiments. A combination of the described features of different embodiments is also feasible. Further in particular non described features of the components associated with the invention can be derived from the component geometries illustrated in the drawing figures.

REFERENCE NUMERALS AND DESIGNATIONS 1 connecting rod
2 piston pin support eye
3 eccentric element
4 first displacement cavity
5 first direction of rotation
6 second displacement cavity
7 second direction of rotation
8 hydraulic valve
9 hydraulic piston
10 compression coil spring
11 radial inner piston surface
12 low pressure range
13 instable switchover range
14 high pressure range
15 radially outer piston surface
16 stop
17 first pressure cavity
18 second pressure cavity
19 seal gap
20 groove base
21 rod bearing axis
22 pivot axis
23 longitudinal axis 24 distance
25 bore hole
26 pinion
27 arm
28 arm
29 support rod
30 support rod
31 linear piston
32 linear piston
33 cylindrical bore hole
34 cylindrical bore hole
35 connecting rod bearing
36 channel
37 channel
38 supply conduit
39 supply conduit
40 check valve
41 check valve
42 space
43 space
44 sleeve shaped housing
45 ring groove
46 ring groove
47 ring groove
48 seal
49 seal
50 bore hole in connecting rod
51 additional seal ring
52 additional seal ring
53 channel
54 channel
55 spring support
56 support sleeve
57 head of support sleeve
58 shoulder of hydraulic piston
59 central mandrel
60 plate shaped head of center mandrel
61 plate shaped head of threaded element
62 threaded element
63 inner thread
64 recesses
65 recesses
66 shoulder of housing
67 enveloping support surface
68 bore hole
69 milled recess
70 enveloping support surface
71 bore hole
72 transversal bore hole
73 outer ring groove
74 first bore hole
75 second bore hole
76 oil pump
77 longitudinal valve axis
78
79
80 third piston surface
81 inner bore hole wall
82 arrow
83 seal gap
84 enveloping support surface
85 first control edge
86 second control edge
87 piston edge
88 piston edge
89 annular bar

What is claimed is:

1. A connecting rod for a two stage variable compression in an internal combustion engine, the connecting rod comprising:
a combustion piston pin support eye that is arranged offset relative to an axis in an eccentrical component which is pivotable about the axis in a first direction of rotation through a first hydraulic displacement cavity and pivotable in a second direction of rotation through a second hydraulic displacement cavity,
wherein a hydraulic valve is arranged in the connecting rod,
wherein the hydraulic valve includes a hydraulic supply connection at which a hydraulic pressure is applied,
wherein the hydraulic pressure moves a hydraulic piston against a force of a preload of a spring,
wherein the hydraulic piston remains in a stable low pressure position in a low range of the hydraulic pressure due to the preload of the spring,
wherein the supply connection is hydraulically connected with the first hydraulic displacement cavity in the stable low pressure position of the hydraulic piston,
wherein the hydraulic piston continues to contact a stop at a housing in a high range of the hydraulic pressure due to a pressure applied to a hydraulic piston surface,
wherein the supply connection is connected with the second hydraulic displacement cavity in a stable high pressure position of the hydraulic piston in the high range of the hydraulic pressure.

2. The connecting rod according to claim 1,
wherein an instable transition range of the hydraulic pressure is provided between the low range of the hydraulic pressure and the high range of the hydraulic pressure,
wherein a movement of the hydraulic piston from the stable low pressure position to the stable high pressure position is provided at a higher hydraulic pressure than a movement from the stable high pressure position to the stable low pressure position.

3. The connecting rod according to claim 2,
wherein the hydraulic piston surface is divided into a radially inner hydraulic piston surface and a radially outer hydraulic piston surface,
wherein the radially inner hydraulic piston surface defines a first pressure cavity and the radially outer hydraulic piston surface defines a second pressure cavity,
wherein the first pressure cavity and the second pressure cavity are separated from one another through a seal gap arranged there between.

4. The connecting rod according to claim 3,
wherein the seal gap is formed between an inner bore hole wall of the housing and an enveloping support surface of the hydraulic piston, and
wherein the enveloping support surface of the hydraulic piston is arranged relative to a longitudinal valve axis between the radially inner hydraulic piston surface and the radially outer hydraulic piston surface.

5. The connecting rod according to claim 3, wherein the second pressure cavity draws hydraulic fluid through a passage that is separate from the first pressure cavity and configured as a milled recess when the hydraulic piston is arranged between the low pressure position and the high pressure position.

6. The connecting rod according to claim 5,
wherein the passage configured as the milled recess is blocked and the first pressure cavity and the second pressure cavity are connected with one another when the hydraulic piston contacts the stop at the housing in the high pressure position.

7. The connecting rod according to claim 1,
wherein both hydraulic displacement cavities are connected with the supply connection through check valves,
wherein the hydraulic fluid is suction feedable from the supply connection or a channel coming from an oil pump.

8. The connecting rod according to claim 1, wherein the hydraulic piston has a second piston surface that is arranged opposite to the piston surface and that is smaller than the piston surface.

9. The connecting rod according to claim 1,
wherein the hydraulic piston has an instable transition position in which a seal gap is formed between an enveloping support surface of the hydraulic piston and the housing,
wherein the seal gap closes a first bore hole leading to the first hydraulic displacement cavity so that a flow from the first hydraulic displacement cavity to the supply connection is blocked, and
wherein a second bore hole leading to the second hydraulic displacement cavity is also blocked, so that a hydraulic pressure from the supply connection moves the hydraulic piston without a fluid exchange from and to the hydraulic displacement cavities influencing a movement of the hydraulic piston.

10. The connecting rod according to claim 9,
wherein an annular bar extending radially outward from a groove base of an outer ring groove of the hydraulic piston is configured as a throttle between the first bore hole and the supply connection, and
wherein the throttle loses its throttling function when the bore hole is covered.

11. The connecting rod according to claim 1,
wherein both hydraulic displacement cavities are connected with the supply connection through check valves,
wherein the hydraulic fluid is suction feedable from the supply connection and a channel coming from an oil pump.

* * * * *